United States Patent [19]

Grant

[11] Patent Number: 5,003,424
[45] Date of Patent: Mar. 26, 1991

[54] APPARATUS FOR CHANGING THE HELIX ANGLE OF MAGNETIC TAPE RELATIVE TO A ROTARY HEAD SCANNER

[75] Inventor: Frederic F. Grant, Bellflower, Calif.

[73] Assignee: Datatape Incorporated, Pasadena, Calif.

[21] Appl. No.: 274,113

[22] Filed: Nov. 21, 1988

[51] Int. Cl.[5] ............................................. G11B 15/60
[52] U.S. Cl. ................................. 360/130.23; 360/85; 242/182
[58] Field of Search ........... 360/85, 84, 130.2, 130.21, 360/130.22, 130.23, 130.3, 130.32, 77.12, 77.13; 242/182, 183; 226/95

[56] References Cited

U.S. PATENT DOCUMENTS

| | | | |
|---|---|---|---|
| 3,418,424 | 12/1968 | Takayanagi | 360/107 |
| 3,592,976 | 7/1971 | McGinnis | 360/130.22 |
| 3,697,676 | 10/1972 | Protas | 360/107 |
| 3,943,566 | 3/1976 | Brock et al. | 360/84 X |
| 4,050,090 | 9/1977 | Kollar | 360/130.23 |
| 4,357,641 | 11/1982 | Dischert | 360/130.23 |
| 4,703,370 | 10/1987 | Inoue et al. | 360/10.2 |
| 4,709,280 | 11/1987 | Delacou | 360/85 |
| 4,763,210 | 8/1988 | Grant | 360/84 |
| 4,772,969 | 9/1988 | Grant | 360/85 |

OTHER PUBLICATIONS

IBM Technical Disclosure Bulletin, vol. 18, No. 7, Dec. 1975, Self-Guiding Bearing, Hammond et al.
IBM Technical Disclosure Bulletin, vol. 18, No. 12, pp. 3931-3934, dated May 1976, Guzman.

Primary Examiner—Robert S. Tupper
Assistant Examiner—Andrew L. Sniezek
Attorney, Agent, or Firm—William F. Noval

[57] ABSTRACT

A helical scan magnetic tape record/reproduce apparatus includes apparatus for changing the helix angle of magnetic tape relative to a rotary head scanner. A pair of elongate, arcuate air-bearing guides are disposed immediately adjacent and tangential to opposite sides of a circumferential surface of the rotary head scanner. The guides are at a first elevation and first angle and a second elevation and second angle, respectively, to cooperatively guide magnetic tape along a path at a predetermined helix angle while the magnetic tape is partially wrapped around the rotary head scanner. The planes of the air-bearing guides are changed in equal but opposite directions to change the helix angle of the tape relative to the rotary head scanner.

4 Claims, 3 Drawing Sheets

APPARATUS FOR CHANGING THE HELIX ANGLE OF MAGNETIC TAPE RELATIVE TO A ROTARY HEAD SCANNER

BACKGROUND OF THE INVENTION

This invention relates in general to helical scan magnetic tape record/reproduce apparatus and, in particular, this invention relates to a technique for changing the helix angle of magnetic tape relative to the rotating heads of the rotary head scanner.

Helical scan magnetic tape record/reproduce apparatus are widely used to record analog or digital inFormation on slant tracks on magnetic tape. Generally, the magnetic tape is contained in a two-reel cartridge or cassette. The magnetic tape recorder includes a tape transport assembly (including stationary and rotating rollers, tension devices, and capstans) to move the tape past the rotating heads oF a rotary head scanner, from supply and to take-up reels of the tape cassette. The rotary head scanner includes upper and lower stationary drums and a head wheel rotatably mounted in a slot between the stationary drums. The head wheel includes one or more magnetic heads mounted on the periphery of the head wheel. The lower drum of the rotary head scanner, typically, has a helical shelf which guides the lower edge of the magnetic tape as it is transported past the rotary head scanner. The tape is oriented relative to the head paths by a pair oF tilted guides at the exit and entry to the rotary head scanner. The guides establish the helix angle oF the path of the tape as it travels around the rotary head scanner.

An elaborate and complicated mechanism is commonly employed for threading the magnetic tape from the cassette along its transport path past the head scanner. Typically, the threading mechanism includes rollers and pulleys mounted on slides and linkages to extract the tape from the cassette and to wrap it around the rotary head scanner. Such mechanical threading mechanisms are complex, noisy and subject to breakdown.

In commonly assigned U.S. Pat. Nos. 4,763,210, issued Aug. 9, 1988, entitled HELICAL SCAN TAPE GUIDE APPARATUS and 4,772,969, issued Sept. 20, 1988, entitled "EXPANDABLE LOOP" METHOD AND APPARATUS FOR AUTOMATICALLY THREADING A WEB MATERIAL, there is disclosed a magnetic tape threading and guiding apparatus including a pair oF concave air-bearing guides disposed immediately adjacent and tangential to opposing sides of a circumferential surface of a rotary head scanner to cooperatively form a path for guiding magnetic tape past the head scanner at a predetermined helix angle. A vacuum source serves to evacuate air from the vicinity oF each air-bearing surFace to create an air pressure gradient, the effect of which is to cause magnetic tape to ride on a thin film of air interposed between the tape and each air-bearing guide during transport oF the tape from a supply reel to a take-up reel. Such a tape threading and guide apparatus, offers several advantages over tape-threading and guide mechanisms of the prior art. For example, since tape threading is fully pneumatic, the threading apparatus is simplified and less expensive. Moreover, tape is threaded and guided in a more gentle and less damaging manner than mechanical devices, thus providing increased efficiency and minimized tape damage.

Ideally, in a helical scan magnetic record/reproduce apparatus, the information recorded in slant tracks on magnetic tape is reproduced by magnetic heads which scan the slant tracks in proper alignment with and directly over the tracks so that an optimal signal is reproduced. However, if a magnetic tape is reproduced at a tape speed different than the speed at which the tape was recorded, the magnetic heads will sweep across the magnetic tape at an angle different than the angle of the slant tracks on the tape. Thus, the reproduce head scans not only the desired track, but also adjacent tracks, causing signal degradation and noise in the reproduced signal. For example, if the reproduce magnetic tape apparatus is operated in a still mode or slow or fast, forward or rewind scan modes, the reproduced signal will be substantially degraded from the recorded signal. In many applications, this is undesirable, for example, when reproducing images at a slow scan rate in order to analyze the motion in a scene recorded at a fast frame rate.

One solution to this problem, is to change the helix angle of wrap of the magnetic tape about the rotary head scanner in order to align the recorded tracks on the magnetic tape with the path oF the rotating magnetic heads. U.S. Pat. No. 3,697,676, issued Oct. 10, 1972, entitled HEAD-TO-TAPE APPARATUS AND METHOD, discloses several techniques for changing the angle formed by the track on magnetic tape and the path of a rotating magnetic head. As shown in FIG. 2 of the latter patent, one technique is to vary the position of entry and exit guides to the rotary head scanner in order to change the helix angle of the path of magnetic tape about the head scanner, so that the path of the reproduce heads are in alignment with the tracks on magnetic tape. Another technique disclosed in FIG. 5 of the latter patent, utilizes a mechanism for changing the angle of rotation of the head wheel of the rotary head scanner relative to the tracks on magnetic tape in order to align the reproduce heads with the recorded tracks. U.S. Pat. No. 4,703,370, issued Oct. 27, 1987, entitled HELICAL SCAN TYPE MAGNETIC TAPE REPRODUCING APPARATUS WITH VARIABLE HEAD-DRUM INCLINATION CAPABILITY, also discloses a mechanism for varying the angle of rotation of the magnetic heads relative to the magnetic tape. Other patents showing adjustment of the helix angle of wrap of magnetic tape about a rotary head scanner, include U.S. Pat. No. 4,709,280, issued Nov. 24, 1987, entitled APPARATUS FOR VARYING THE PATH OF MAGNETIC TAPE PASSING OVER A ROTARY HEAD; U.S. Pat. No. 3,418,424, issued Dec. 24, 1968, entitled MAGNETIC RECORDING AND REPRODUCTION OF TELEVISION SIGNALS; and IBM Technical Disclosure Bulletin, Vol. 18, No. 12, pages 3931–3934, dated May 1976, entitled DISTORTION FREE TAPE STEERING MECHANISM. Each of the techniques, disclosed in these latter documents, use an adjustable tape guide for varying the helix angle of wrap of magnetic tape about a rotary head scanner.

The known techniques for varying the helix angle of wrap of magnetic tape about a rotary head scanner (as exemplified by the patents and publications referred to above) are disadvantageous because of the complex mechanical arrangements for guiding the tape during its transport past the rotary head scanner and because of the potential damage to the tape in varying tape guide elements.

SUMMARY OF THE INVENTION

According to the present invention, there is provided apparatus for changing the helix angle of wrap of magnetic tape about a rotary head scanner which overcomes the disadvantages of the prior art. According to an aspect of the present invention, a pair of elongate, arcuate air-bearing guides are disposed immediately adjacent and tangential to opposite sides of a circumferential surface of a rotary head scanner of a helical scan magnetic tape recorder to guide tape in a path around the scanner. The guides are positioned at a first elevation and first angle and a second elevation and second angle, respectively, to cooperatively form a path for guiding magnetic tape at a helix angle relative to the path oF rotating magnetic heads oF the rotary head scanner. A vacuum source serves to evacuate air from the vicinity of the air-bearing surfaces to create an air pressure gradient. The effect of this gradient is to cause the magnetic tape to ride on a film of air interposed between the tape and each of the air-bearing guide surfaces during transport of the tape. The tape is, thus, gently guided without complex guide mechanisms.

According to a feature of the present invention, each air-bearing guide is movable in equal and opposite directions to change the helix angle of wrap of the magnetic tape path about the rotary head scanner. According to another aspect of the present invention, the air-bearing guides are mounted by means of flexures which establish the axis of rotation of each air-bearing guide to coincide with a center line oF magnetic tape along a segment of the path. Each air-bearing guide assembly is pivoted around such axis by means of a drive, such as a stepper motor drive.

BRIEF DESCRIPTION OF THE DRAWINGS

The invention will be described with reference to the accompanying drawings wherein like numbers are used for like elements.

DETAILED DESCRIPTION OF THE PREFERRED EMBODIMENT

Although a preferred embodiment of the present invention will be described below with respect to a magnetic tape record/reproduce apparatus, it will be understood that the present invention may be used in any web transport apparatus in which it is desirable to change the angle of the path of a web past a utilization device.

Figure 1:
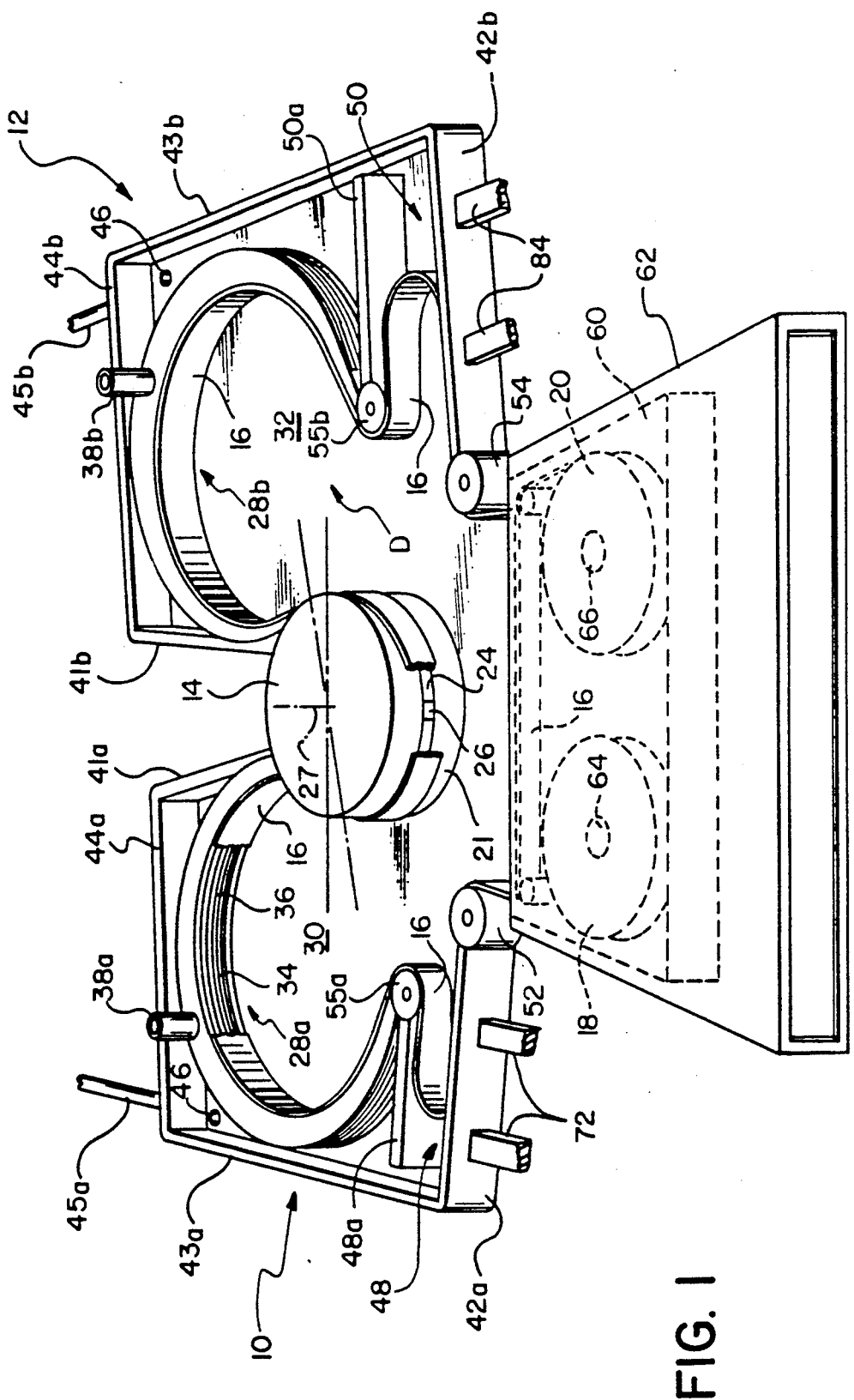
FIG. 1 is a perspective view of an air-bearing tape transport apparatus including an embodiment of the present invention.
Figure 2:
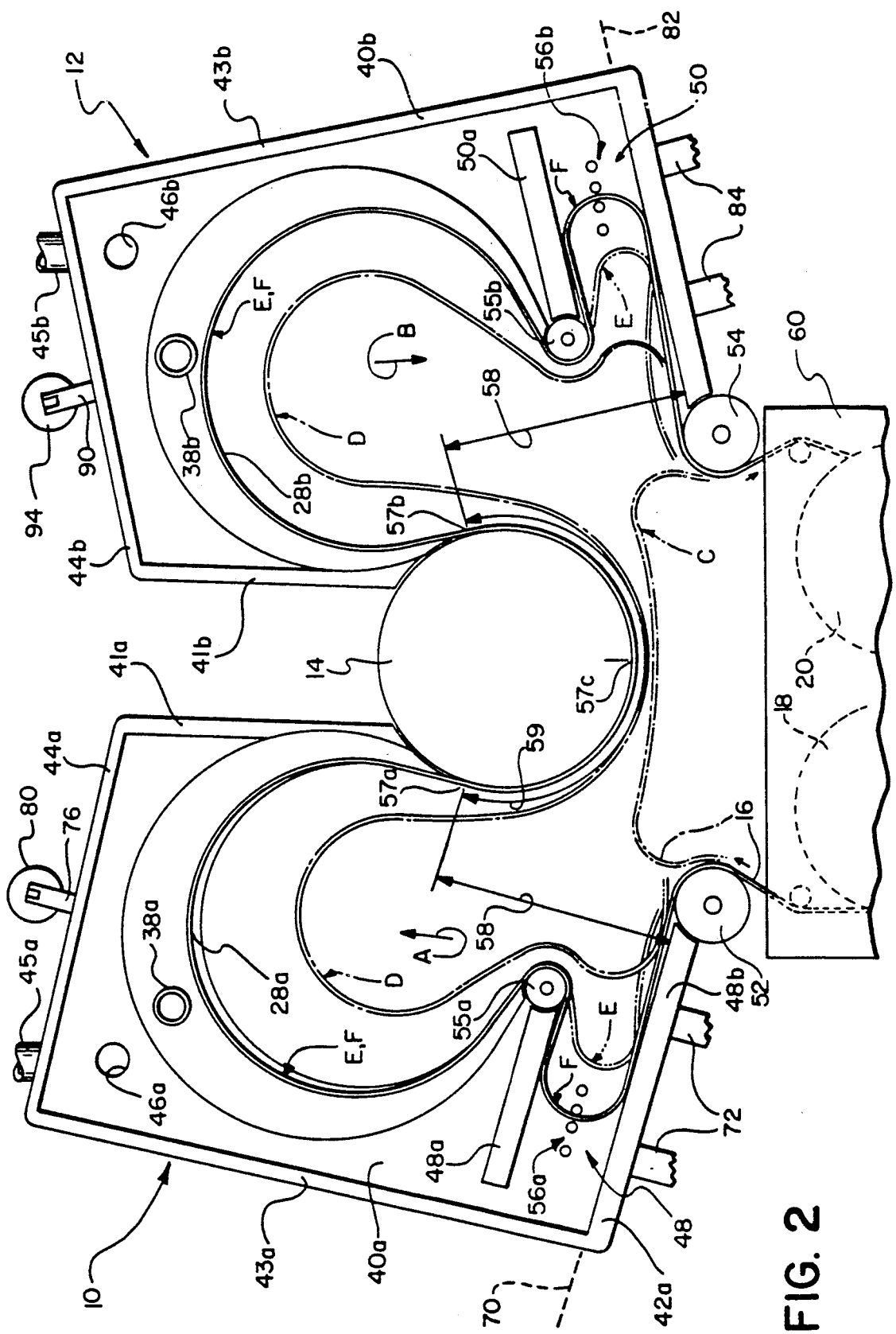
FIG. 2 is a top plan view of the apparatus of FIG. 1.

Referring now to FIGS. 1 and 2, there is shown helical scan magnetic tape record/reproduce apparatus in which an embodiment of the present invention is incorporated. As shown, the apparatus has transport assemblies 10 and 12 which include a series of transport elements arranged to form a cooperative pair of symmetrical paths on opposite sides of a rotary head scanner 14 for guiding magnetic tape 16 from a supply reel 18 past the rotary head scanner 14 to a take-up reel 20. From the description below, it will be understood, that an upper covering wall is omitted from the apparatus of FIGS. 1 and 2 for purposes of more clearly illustrating the present invention. Rotary head scanner 14 includes upper and lower fixed drums 21 and 22, respectively, and a head wheel 24 having one or more magnetic heads 26. Head wheel 24 is mounted for rotation about an axis 27.

Magnetic tape 16 is guided at a predetermined angle 0 relative to a plane of rotation of the head wheel 24 as the tape is wrapped at least partially around scanner 14. Thus, magnetic head 26 records successive adjacent slant track on magnetic tape 16 as the tape is transported around scanner 14 between reel 18 and reel 20.

According to the present invention, magnetic tape 16 is guided along a transport path at a helix angle which is changeable past rotary head scanner 14, by means of a pair of elongate, concave air-bearing guides 28a and 28b which are disposed immediately adjacent and tangential to opposite sides of scanner 14. Each concave air-bearing guide 28a, 28b terminates at an appropriate elevation and angle relative to scanner 14 to cause magnetic tape 16 to follow a path of wrap around scanner 14 at a desired helix angle. Thus, guide 28a is located on the tape entry side oF scanner 14 and is disposed in a reference plane 30 relative to the plane of head wheel 24. Similarly, guide 28b is located on the tape exiting side of scanner 14 and is disposed in a second reference plane 32 relative to the plane of head wheel 24.

As shown in FIG. 1, guide 28a comprises a series of spaced, parallel tubes 34, each of which has an arcuate forward surface adjacent to the magnetic media side of magnetic tape 16. The forwardly facing surfaces of respective tubes 34 are coplanar, for cooperatively forming a concave air-bearing surface to guide tape 16. To that end the surface of each tube 34 has a series of relatively small vent holes 36 spaced equally in the direction of the tape path for supporting the tape 16 on a thin film of air. Nozzles 38a and 38b are connected to an air source (not shown) and each serves to fill each tube 34 with air under positive pressure. Thus, the air vented through tubes 34 assure a continuous air film between tape 16 and guide 28a. Guide 28b is constructed in similar manner. Reference is made to the above-mentioned U.S. Pat. No. 4,763,210 for a more detailed description of the structure and operation of air-bearing guides 28a and 28b.

Guide 28a is supported in an enclosed housing (FIG. 4) having an upper wall 39a, a lower wall 40a and side walls 41a, 42a, 43a, and 44a. Similarly, air-bearing guide 28b is supported in a housing (FIG. 3) having an upper wall 39b, a lower wall 40b and side walls 41b, 42b, 43b, and 44b.

Referring again to FIGS. 1 and 2, the tape transport assembly includes tape guides 52 and 54, vacuum columns 48 and 50 and capstans 55a and 55b. Tape guides 52, 54 are perpendicular to the operative plane of head wheel 24 and serve to change the direction of tape 16 between a respective tape reel and its corresponding vacuum column. Vacuum columns 48 and 50 control tape tension under the influence of fluctuations in the speed of their respective tape reel. Vacuum column 48 on the tape entering side of scanner 14 is positioned in plane 30 and vacuum column 50 is positioned in plane 32. Vacuum columns 48 and 50 also function to change the elevation of tape 16 in the appropriate direction between the planes of the tape reels and the planes 30, 32 of the corresponding air-bearing guides 28a, 28b. Capstan 55a located on the slope of plane 30 controls the speed of magnetic tape 16 from supply reel 18 into air-bearing guide 28a. Similarly, capstan 55b mounted on the slope of plane 32 controls the speed of tape 16 from the air-bearing guide 28b to the take-up reel 20.

Each air-bearing guide 28a, 28b functions to guide tape 16 at the appropriate elevation and angle past head wheel 24 of rotary head scanner 14. As shown in FIG. 2, the plane 30 of guide 28a and the vacuum column 48 slopes relative to the plane of head wheel 24 in the direction of arrow A at angle O. Similarly, the plane 32 of tape exiting guide 28b and vacuum column 50 slopes in an opposite direction at angle O in the direction of arrow B relative to the plane of head wheel 24. For guiding the tape 16, air-bearing guide 28a terminates immediately adjacent to and tangential to a circumferential surface of head scanner 14 at a reference tape entering point denoted 57a. Similarly, air-bearing guide 28b is arranged adjacent and tangential to the head scanner 14 at a corresponding tape exiting point 57b. To guide the tape 16 at the appropriate elevation, head scanner 14 is spaced equally from both vacuum columns 48, 50.

While wrapped around the head scanner 14, magnetic tape 16 travels upwardly from the tape tangency point 57a to mid point 57c at the helix angle of O and from this mid point, an equally further distance to the tape tangency point 57b. At mid point 57c, the tape 16 has returned to the elevation it had when it exited cassette 60. Likewise, after traveling further up the helical path and exiting the head scanner at point 57b, the tape 16 curves generally downward in elevation to return to it starting elevation upon exiting vacuum column 50.

The net decrease in elevation of the tape 16 as it travels from supply reel 18 to where it enters head scanner 14 at tape tangency point 57a is directly proportional to the distance represented by arrow 58. Similarly, the net increase in tape elevation as it travels from point 57a to the mid point 57c of the head scanner 14 is equal to the decrease in tape elevation from reel 18 to the entry point 57a of the head scanner. Accordingly, the distance, represented by arrow 58, on the tape entering side of the transport path equals one-half of the distance, represented by arrow 59, that the tape 16 travels while in contact with head scanner 14. By similar logic, the distance, represented by arrow 58, on the tape exiting side of the head scanner 14 must also equal one-half of the tape wrap distance 59.

Referring to FIG. 2, the threading of tape 16 from cartridge 60 into the transport assembly is effected by applying a vacuum from a suitable vacuum source (not shown) by means of conduits 45a and 45b to openings 46a and 46b in walls 40a and 40b. As negative air pressure is applied through openings 46a and 46b, tape 16 is withdrawn from cartridge 60 and successively assumes positions represented by arrows C, D, E and F as the tape is drawn into the transport assembly. Arrow F represents the tape in its operative transport path wrapped around scanner 14 and guided by air-bearings 28a and 28b.

According to the present invention, there may be applications or operating modes of the magnetic tape record/reproduce apparatus in which it is desired to change the helix angle of wrap of magnetic tape 16 around rotary head scanner 14. Thus, where the tracks recorded on magnetic tape 16 are recorded at one speed and played back at another speed, the reproduce head 26 on rotating head wheel 24 will be misaligned with the recorded track, producing reproduced information signals which are degraded and noisy. (For example, where the tape 16 is played back in a still mode, in slow scan forward or reverse modes, or in fast scan forward and reverse modes, the recorded track on tape 16 will be misaligned with the path of reproduce heads 26.) Thus, to reproduce an optimal signal, it is desirable to change the helix angle of wrap of tape 16 around scanner 14. According to an embodiment of the present invention, the change in helix angle oF tape 16 is effected by changing the elevation and angle at which the tape 16 enters and exits from scanner 14. This is effected by moving transport assemblies 10 and 12 in equal but opposite directions.

Figure 4:
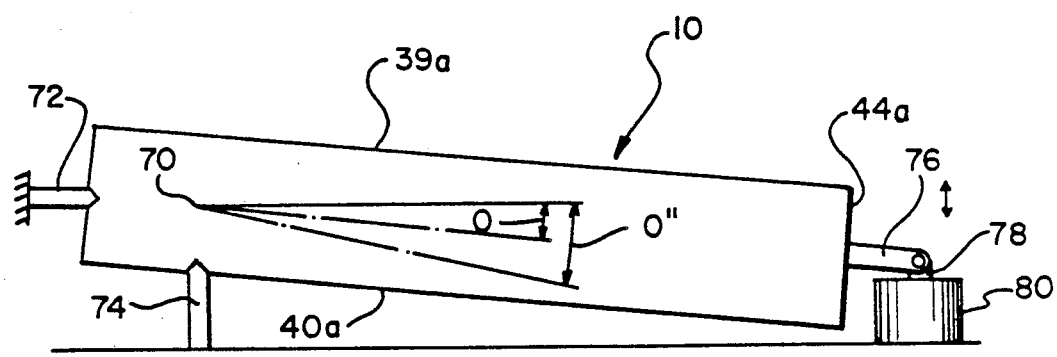

As shown more clearly in FIG. 4, transport assembly 10 is mounted for pivotal movement about axis 70 by means of flexure members 72 secured to side wall 42a of transport assembly 10 and flexure members 74 secured to bottom wall 40a of assembly 10. Axis 70 coincides with the center line of a supply segment of tape 16. The opposite end of assembly 10 has its elevation changed by means of linkage 76 attached to side wall 44a at one end and at the other end to linkage 78 of actuating motor 80 (such as a stepper motor).

Figure 3:
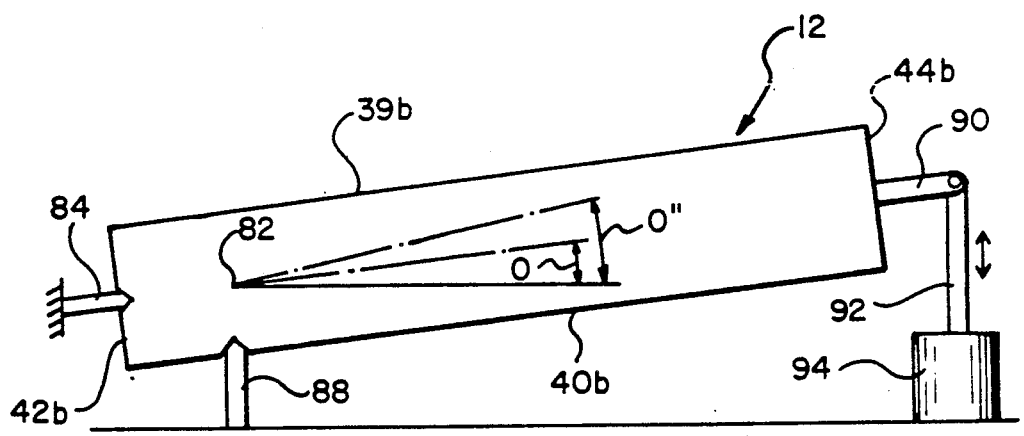
FIGS. 3 and 4 are respectively side elevational views of the mounting and drive assemblies for the air-bearing guides of the apparatus of FIGS. 1 and 2.

Similarly, as shown in FIG. 3, transport assembly 12 is mounted for pivotal movement about axis 82 by means of flexure members 84 attached to wall 42b of assembly 12 and flexure members 88 attached to wall 40b assembly 12. Axis 82 coincides with the center line of a take-up segment of tape 16. A linkage 90 secured to wall 44b at one end is pivotally connected to drive linkage 92 of actuator motor 94.

Figure 5:
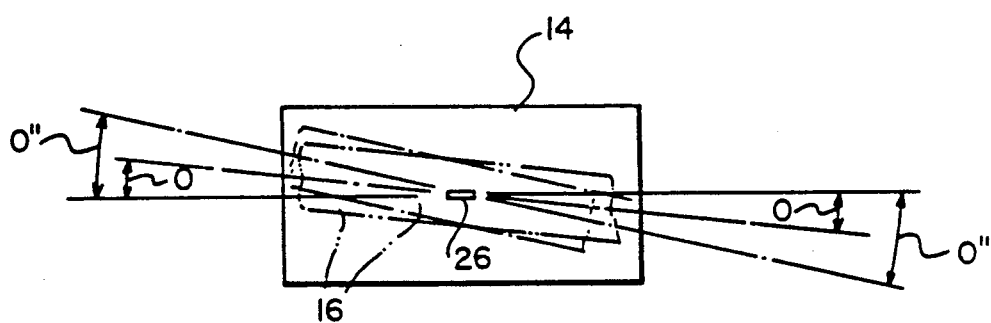
FIG. 5 is a diagrammatic elevational view useful in illustrating operation of the present invention.

The operation of the embodiment of FIGS. 3 and 4 to change the helix angle of magnetic tape 16 around rotary head scanner 14 is as follows. Assuming that the normal helix angle of wrap of tape 16 around scanner 14 is O, if the tape is run at a different speed, it is assumed that movement of the tape to a helix angle of O" will align the reproduce heads 26 on head wheel 24 with the recorded tracks on the tape. In such case, actuator motor 94 causes linkage 92 to elevate the end 44b of assembly 12 thus causing rotation of assembly 12 around axis 82 from an angle O with respect to the horizontal to an angle O" with respect to the horizontal. Similarly, actuator motor 80 decreases the elevation of end 44a of assembly 10 by causing linkage 78 to pivot assembly 10 around pivot axis 70 to increase the angle of declination of assembly 10 from angle O to angle O". Thus, by changing the elevation of assemblies 10 and 12 in equal but opposite directions, the helix angle of wrap of tape 16 around scanner 14 is increased from angle O to angle O" (see FIG. 5).

The invention has been described in detail with reference to the Figs., however, it will be appreciated that variations and modifications are possible within the scope and spirit of the invention.

What is claimed is:

1. An apparatus having a web utilization station and means for moving an elongate strip of flexible web past said utilization station at a helix angle from a web supply to a web take-up, the invention comprising:

web guide means for defining a pair of elongate, arcuate, air-bearing guides disposed immediately adjacent and tangential to opposing sides of a circumferential surface of said utilization station at a first elevation and first angle and a second elevation and second angle, respectively, to cooperatively form an operative path for guiding said web at a helix angle while wrapped at least partially around said utilization station;

means cooperating with said web guide means for creating an air pressure gradient the effect of which is to urge said web toward each air-bearing guide, and air pressure means to maintain said web in its operative path with a thin film of air sandwiched between each said air-bearing guide and said web while the web is wrapped around said utilization station during transport of said web along said path;

means spaced from said web guide means for supporting respective supply and take-up web sections; and means for mounting each of said pair of arcuate air-bearing guides for rotation about respective rotation axes in equal but opposite directions in order to change the helix angle of said path relative to said web utilization station, said rotation axes being spaced from said utilization station and coinciding with respective center lines of web along said input and output web segments.

2. The invention of claim 1 wherein said means for mounting includes a separate housing supporting each of said pair of air-bearing guides, each said housing having spaced upper and lower walls and a plurality of side walls enclosing said guide, and further includes first and second flexure members respectively affixed to one of said upper and lower walls and one of said plurality of side walls, wherein said first and second flexure members establish said axis of rotation of each of said air-bearing guides and respective means connected to each said housing for pivoting each of said housings and its air-bearing guide about its respective axis of rotation to effect said helix angle change.

3. A magnetic tape record/reproduce apparatus having a rotary head scanner and means for moving an elongate strip of magnetic tape from a web supply to a web take-up past said rotary head scanner at a helix angle, the invention comprising:

tape guide means for defining a pair of elongate, arcuate, air-bearing guides disposed immediately adjacent and tangential to opposing sides of a circumferential surface of said rotary head scanner at a first elevation and first angle and a second elevation and second angle, respectively, to cooperatively form an operative path for guiding said magnetic tape at a helix angle while wrapped at least partially around said rotary head scanner;

means cooperating with said tape guide means for creating an air pressure gradient the effect of which is to urge said tape toward each air-bearing guide, and air pressure means to maintain said tape in its operative path with a thin film of air sandwiched between each said air-bearing guide and said tape while said tape is wrapped around said rotary head scanner during transport of said tape along said path;

means spaced from said tape guide means for supporting respective supply and take-up tape sections; and means for mounting each of said pair of arcuate air-bearing guides for rotation about respective rotation axes in equal but opposite directions in order to change the helix angle of said tape path relative to said rotary head scanner, said rotation axes being spaced from said rotary head scanner and coinciding with respective center lines of tape along said input and output tape segments.

4. The invention of claim 3 wherein said means for mounting includes a separate housing supporting each of said pair of air-bearing guides, each said housing having spaced upper and lower walls and a plurality of side walls enclosing said guides, and further includes first and second flexure members respectively affixed to one of said upper and lower walls and to one of said plurality of side walls wherein said first and second flexure members establish said axis of rotation of each of said air-bearing guides and respective means connected to each said housing for rotating each of said housing and its air-bearing guide about its respective axis of rotation to effect said helix angle change.

* * * * *

UNITED STATES PATENT AND TRADEMARK OFFICE
CERTIFICATE OF CORRECTION

PATENT NO. : 5,003,424

DATED : March 26, 1991

INVENTOR(S) : Frederic F. Grant

It is certified that error appears in the above-identified patent and that said Letters Patent is hereby corrected as shown below:

In column 7 lines 21-22, delete "input and output web segments" and insert "supply and take-up web sections".

Column 8, line 28, delete "input and output tape segments" and insert "supply and take-up tape sections".

Signed and Sealed this

Thirteenth Day of October, 1992

Attest:

DOUGLAS B. COMER

Attesting Officer

Acting Commissioner of Patents and Trademarks